United States Patent [19]

Mamadzhanov et al.

[11] 4,321,135
[45] Mar. 23, 1982

[54] METHOD FOR SEPARATING SOLID PHASE FROM DRILLING MUD

[76] Inventors: Ulmas D. Mamadzhanov, TS-1, dom 19, kv. 25; Vitold M. Bakhir, proezd Gaidara, 7-a, kv. 17; Stanislav A. Alekhin, Chilan-zar, kvartal 24, dom 53, kv. 89; Vladimir I. Klimenko, Chilan-zar, kvartal 23, dom 3, kv. 37, all of Tashkent, U.S.S.R.

[21] Appl. No.: 224,549

[22] PCT Filed: Feb. 1, 1980

[86] PCT No.: PCT/SU80/00016
§ 371 Date: Nov. 27, 1980
§ 102(e) Date: Nov. 25, 1980

[87] PCT Pub. No.: WO80/02044
PCT Pub. Date: Oct. 2, 1980

[30] Foreign Application Priority Data

Mar. 27, 1979 [SU] U.S.S.R. .............................. 2736502

[51] Int. Cl.³ .............................................. B03B 5/00
[52] U.S. Cl. ...................................... 209/49; 209/155;
209/210; 175/66; 210/787
[58] Field of Search ............... 209/1, 45, 46, 49, 155, 209/207, 210; 175/66, 206, 207; 210/784, 787

[56] References Cited

U.S. PATENT DOCUMENTS 1,446,949 2/1923 Testrup .................................. 209/1
2,189,698 2/1940 Bierbrauer ............................ 209/49
2,219,312 10/1940 Hayward ............................... 175/66
2,291,447 7/1942 Bierbrauer ............................ 209/49
3,642,605 2/1972 Chenel ............................ 204/180 R

FOREIGN PATENT DOCUMENTS 109992 2/1964 Czechoslovakia ..................... 209/1
2533229 2/1976 Fed. Rep. of Germany ...... 210/784
8002047 10/1980 PCT Int'l Appl. ..................... 209/1
495794 11/1938 United Kingdom .................. 209/49

Primary Examiner—Ernest G. Therkorn
Attorney, Agent, or Firm—McAulay, Fields, Fisher, Goldstein & Nissen

[57] ABSTRACT

A method for separating solid phase from drilling mud, comprising forming from drilling mud an adhesive layer 4 on a revolving closed curvilinear surface 3 by partially submerging it in the drilling mud and forming from a treatment liquid (5) an adhesive layer (7) on another closed curvilinear surface (6) which is caused to rotate in the direction opposite to the rotation direction of the first curvilinear surface (3). Both closed curvilinear surfaces (3, 6) are arranged in such a manner that their adhesive layers (4, 7) penetrate one another at a depth sufficient for the adhesive layer (7) of the treatment liquid to take-off coarse solid phase particles from the adhesive layer (4) of the drilling mud. Linear velocities of the adhesive layers (4, 7) are chosen in such a manner that the resultant centrifugal forces be equal to or lower than the centripetal forces.

3 Claims, 1 Drawing Figure

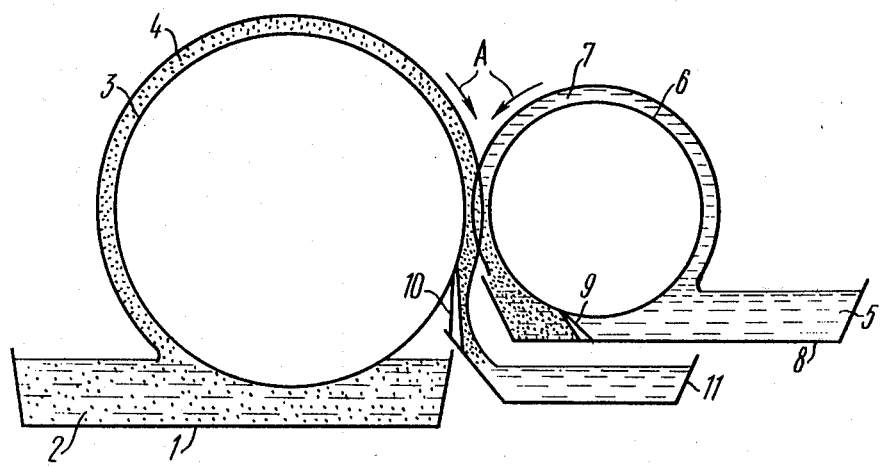

METHOD FOR SEPARATING SOLID PHASE FROM DRILLING MUD

TECHNICAL FIELD

The present invention relates to the drilling techniques, and more particularly, to methods for separating solid phase from drilling mud.

The method may be most advantageously used in drilling oil and gas production wells and geological prospecting boreholes.

The method of the present invention may also be used in the chemical industry, in the manufacture of constructional materials and in other industries where solid phase is to be separated from suspensions.

BACKGROUND OF THE INVENTION

Drilling mud is known to represent a heterogeneous system which inevitably contains colloidal solid phase particles. The presence of such particles in drilling mud determines a number of important geological properties of drilling mud from the viewpoint of well drilling performance. Drilling mud is required to retain these properties to ensure best drilling performance. However, a steady maintenance of these properties during drilling is a very difficult problem.

The vast majority of drilling operations are conducted in clayey rocks. Clayey rocks being drilled are partly dispersed and get to the drilling mud in the form of colloidal particles to cause a substantial change in the composition of drilling mud even after several pumping cycles.

Various methods for separating solid phase from drilling mud should be used for the restoration of its properties. Therefore, economical and efficient separation of solid phase from drilling mud or, which is the same, an efficient cleaning of drilling mud from drillings (solids) has a decisive importance in the well drilling process.

Technical and economical performance of drilling depends to a large extent on quality of drilling mud used and the degree of its cleaning from drillings.

High-grade cleaning of drilling mud improves mechanical speed of drilling and conditions for operation of drill bits and equipment. In addition to an improvement of mechanical speed of drilling, high-grade cleaning of drilling mud contributes to reduced consumption of materials used for maintaining properties of drilling mud, prolongs the life of drilling mud and reduces complications and emergency situations during drilling.

Low quality of drilling mud cleaning is the main cause of emergency situations and complications associated with mud absorption, jamming of drilling and case pipes, avalanches from well walls.

Therefore, high-grade cleaning of drilling mud from drillings is the most important technical step during drilling which substantially affects technical and economical performance of well drilling.

All existing methods for cleaning drilling mud enable the removal of only some part of solid phase from the drilling mud at different rate and quality. All these methods have, however, a number of disadvantages inherent in the very concept of separation on which they are based. Thus, minimum size of particles that may be separated from drilling mud on vibratory screens depends on the mesh size of a screen. With a reduction of mesh size to improve quality of cleaning, the throughput capacity materially decreases and drilling mud losses with solids increase.

In cleaning with the employment of hydrocyclones, coarse and heavy-weight particles of solid phase are removed from drilling mud. Finer and light-weight particles (below 20 $\mu$m) cannot be removed in hydrocyclones and other cleaning apparatus.

Known in the art is a method for, regenerating drilling mud, wherein drilling mud leaving the well and containing drillings is preliminarily diluted and separated from coarse particles of drillings. Fine non-charged particles of drillings remain in such diluted and cleaned drilling mud, as well as negatively charged colloidal clayey particles. Subsequently negatively charged clayey particles are separated from the drilling mud by depositing them to a rotary anode with subsequent removal by means of a scaper. The deposited negatively charged clayey particles entrain a part of non-charged particles which are also deposited on the rotary anode (cf. Czechoslovakian Pat. No. 109992, cl. 5a, 31/20, issued on Feb. 12, 1964).

Using the above-described method, only a part of drilling mud can be cleaned, and the remaining part of drilling mud is fed to the well without cleaning.

Cleaning only a part of drilling mud and the separation of coarse particles first, and then fine particles is very complicated under production conditions, hence, costly.

DISCLOSURE OF THE INVENTION

It is an object of the invention to provide a method for separating solid phase which enables cleaning of all drilling mud leaving the well by using comparatively simple techniques.

With this object in view, it is contemplated a method for separating solid phase from drilling mud, wherein an adhesive layer is formed from drilling mud on a revolving closed curvilinear surface partially submerged in the drilling mud, and an adhesive layer is formed from a treatment liquid on another closed curvilinear surface which is partially submerged in the treatment liquid and caused to rotate in the direction opposite to the rotation direction of the first revolving curvilinear surface, both closed curvilinear surfaces being arranged in such a manner that their adhesive layers penetrate one another at a depth sufficient for the adhesive layer of the treatment liquid to take-off coarse solid phase particles from the adhesive layer of the drilling mud, the linear velocities of the adhesive layers being chosen in such a manner that the resultant centrifugal forces be equal to or lower than the centripetal forces.

The depth of penetration of one adhesive layer in the other is preferably chosen in accordance with the size of solid phase particles.

Particles of solid phase are distributed along the depth of adhesive layer in accordance with their size. Therefore, by controlling the depth at which one adhesive layer penetrates the other adhesive layer the size of solid particles taken-off is also controlled.

The linear velocity of adhesive layer of the treatment liquid is preferably maintained equal to or greater than the linear velocity of the adhesive layer of the drilling mud.

This facility ensures an optimum process of separating solid phase from drilling mud.

Therefore, the method for separating solid phase from drilling mud according to the invention ensures high degree of cleaning of all drilling mud and makes it possible to control the removal of solid phase over a wide range. Considerable technological advantages of the method according to the invention are achieved using simple techniques and economical processing steps. A simple kinematic chain guarantees reliable operation of the method for separating solid phase from drilling mud according to the invention. The use of this method is much more effective compared to the existing methods for cleaning drilling mud employed at drilling sites nowadays.

BEST MODE FOR CARRYING OUT THE INVENTION

A specific embodiment of the invention will now be described with reference to the accompanying drawings illustrating the method for separating solid phase from drilling mud according to the invention.

Drilling mud 2 is fed to a tank 1. The drilling mud is caused to form on a closed curvilinear revolving surface 3 an adhesive layer 4, and to do this, the revolving closed curvilinear surface 3 is partially submerged in the drilling mud 2.

In this particular embodiment the closed curvilinear surface comprises a surface of a drum also indicated at 3.

Solid particles are re-distributed in accordance with their volume and weight over the adhesive layer 4 under the action of centrifugal forces and surface tension forces. Coarser and heavier particles tend to the outer surface of the adhesive layer 4, whereas finer and especially colloidal particles accumulate at the inner surface of the adhesive layer 4.

A treatment liquid 5 which comprises a non-structured Newtonian fluid exhibiting a low static shear resistance, that is a sedimentary unstable liquid is used to form on another revolving closed curvilinear surface 6 and adhesive layer 7. In this embodiment the other closed curvilinear surface comprises the surface of a drum also indicated at 6. To form the adhesive layer 7, the drum 6 is partially submerged in the treatment liquid 5 which is in a tank 8.

The drums 3 and 6 are caused to rotate in opposite directions as shown by arrows A in the drawing.

The drums 3 and 6 are installed in parallel with one another so that their adhesive layers 4, 7 penetrate one another at a depth sufficient for the adhesive layer 7 of the treatment liquid 5 to take-off coarse particles of solid phase from the adhesive layer 4 of the drilling mud 2.

Upon contact between the adhesive layers 4 and 7 and, which is the more so, after one layer penetrates the other, transistion of solid phase particles from one layer to the other is facilitated owing to the fact that surface tension forces rease to act on these particles.

Linear velocities of the adhesive layers 4, 7 are chosen in such a manner that the resultant centrifugal forces be equal to or lower than the centripetal forces so as to avoid tearing-off of solid phase particles from portions of adhesive layers located beyond the zone of their contact.

A centrifugal force acting on a solid phase particle in the adhesive layer 4 is $$F = mv^2/R, \quad (1)$$

wherein m is the mass of particle;
R is the radius or rotation of particle;
V is the linear velocity of the drum surface.

On the other hand, the particle weight, force of viscous friction and force of surface tension $F_1$ of the adhesive layer 4 which is $$F_1 = 2\pi r\sigma, \quad (2)$$

wherein $\sigma$ is the coefficient of surface tension of adhesive layer 4 of the drilling mud 2;
r is the radius of particle, also act on the particle.

To evaluate the importance of forces participating in the distribution of solid particles in the surface layer, the Froude number (Fr) is used showing the ratio at which centrifugal forces are greater than gravity $$Fr = \omega^2 R/g, \quad (3)$$

wherein $\omega$ is the angular velocity of the drum;
R is the radius of rotation of the particle;
g is the acceleration of gravity.

The Froude numbers for actual structures vary from 20 to 2000.

Accordingly, in calculating the forces acting on solid particles in the adhesive layer 4, it is not necessary to take an account on their weight because centrifugal forces are 20 to 2000 times greater.

Since the friction force at the surface of solid phase particles continuous to the liquid entraining them into a rotary motion is directed along a tangent line to the surface of the drum 3 and at right angles to its radius, radial displacements of particles (that is the main process parameters of separation of solid and liquid phases) may be considered without taking into account forces of viscous friction.

Assuming the equality of centrifugal forces and forces of surface tension, a condition for the equilibrium of particles in the adhesive layer 4 at the cylindrical surface of the rotary drum 3 may be obtained.

Therefore, the main parameters of the process for separating solid phase from the drilling mud 2 at the revolving cylindrical surface are the rotary speed of the drum 3, the amount of surface tension of the adhesive layer 4 of the drilling mud 2 and radius R of particle rotation.

During rotation of the drum 3 the adhesive layer 4 forms on its surface with a thickness which depends on viscosity of the drilling mud 2. Solid drillings, weighting component and excessive clayey phase are present in the adhesive layer 4, in the liquid. Solid phase does not precipitate in the tank 1 as the drilling mud 2 is sedimentary stable and retains solid phase in its composition (by definition, the drilling mud must entrain solids therewith out of the well face).

During rotation of the drum 3 the solid phase from the adhesive layer 4 of the drilling mud 2 tends, under the action of centrifugal forces, towards the surface of the adhesive layer 4 and is distributed over this layer in accordance with the particle size, specific density of particles, rotary speed of the drum 3 and amount of surface tension. Considering these factors, the depth of penetration of the adhesive layer 4 into the adhesive layer 7 is chosen in accordance with solid phase particle size.

When the adhesive layers 4 and 7 penetrate one another, the linear velocity of the adhesive layer 7 of the treatment liquid 5 is set to be greater than the linear velocity of the adhesive layer 4 of the drilling mud 2 by causing the drum 6 to rotate at higher speed relative to the rotary speed of the drum 3. Thus the adhesive layer 7 entrains a part of the adhesive layer 4 together with solid phase present therein, this part being subsequently removed from the drum 6 by means of a scraper 9 into the tank 8. As the liquid in the tank 8 is not sedimentary stable, the solid phase that gets to the liquid in the tank 8 settles down to the bottom wall of the tank 8.

Cleaned fraction of drilling mud is shorn-off by means of a scraper 10 and is fed to a tank 11.

By changing the rotary speed of the drums 3 and 6 the distribution of solid phase in the drilling mud 2 may be controlled over a wide range to remove an excess of solid phase.

The method according to the invention makes it possible to regenerate the weighting component. To extract the weighting component leaving the well together with solids the drilling mud is caused to pass through a dispergating apparatus for the comminution of drillings to the size of weighting component particles.

After the dispergation, the drilling mud is subjected to the centrifugal separation by the method according to the invention. In this way, the weighting component particles of a density of 4.2 g/cm$^3$ are separated from other solid phase particles which have twice as low density.

An example of application of the method according to the invention is given by the results of studies conducted to establish optimum parameters for cleaning the drilling mud 2 from solids.

The main drum 3 was tested with various diameters between 100 and 500 mm at a rotary speed from 10 to 10000 rpm. The same parameters had the second drum 6.

It was shown that at a rotary speed of the main drum 3 from 150 to 200 rpm the thickness of the resultant adhesive layer 4 of the drilling mud 2 of a viscosity between 10 and 100 cPu was from 1.5 to 3 mm. A small thickness of the adhesive layer 4 was due to the liquid flowing down from the surface of the drum 3 at a low rotary speed of the drum. This thickness of the adhesive layer 4 did not permit to obtain a desired throughput capacity of the drum 3.

Within the rotary speed range from 200 to 500 rpm, the thickness of the adhesive layer 4 on the surface of the drum 3 at drilling mud viscosity between 10 and 100 cPu varied from 3 to 8 mm.

It has been found during the study that the speed of rotation of the surface of the adhesive layer 4 in contact with air was much lower (from 10 to 30 times) compared to the rotary speed of the drum 3. Therefore, it was not possible to achieve sufficient degree of cleaning at the rotary speed of the drum within the range from 100 to 2000 rpm (which is an optimum range from the point of view of a theoretical calculation based on the assumption of the adhesive layer rotating in unison with the drum 3 to remove solid phase particles with minimum size to 70 μm).

In case a speed equal to the rotary speed of the drum 3 is imparted to the outer surface of the adhesive layer 4 by means of the drum 6, the theory for the degree of cleaning is completely confirmed.

It has been found during the study that, to obtain high-grade cleaning of drilling mud of a viscosity from 10 to 100 cPu (with minimum particle size removed up to 20 μm) it was necessary to rotate the drum 3 at a speed from 1000 to 2000 rpm.

In this way, to clean a low-solid drilling mud (up to 30-40% of solid phase) with maximum solid particle size between 200 and 300 mm, the diameter of the main drum 3 is chosen between 420 and 500 mm and its rotary speed is from 1800 to 2000 rpm. The diameter of the second drum 6 should be between 140 and 160 mm and its rotary speed from 5000 to 6000 rpm. In such case the depth of cleaning in terms of the lower size limit is from 12 to 16 μm, and the total volume of solid phase is lowered by 10-12%.

In cleaning a high-solid drilling mud (up to 65-70% of solid phase) with solid particle size over 1 mm, the diameter of the main drum should be between 100 and 120 mm and its rotary speed varies from 100 to 1200 rpm. In this case the diameter of the auxiliary drum is between 30 and 40 mm and its rotary speed varies from 3000 to 3600 rpm. The depth of cleaning in terms of the lower limit size is between 40 and 50 μm, and the total volume of solid phase is lowered by 20 to 25%.

Therefore, the method for the centrifugal separation of solid phase from drilling mud on revolving cylindrical surfaces enables the control of the amount of solid phase and the size of particles being separated over a wide range up to a complete clarification of liquid, which was impossible in methods and apparatus employed so far.

The method according to the invention enables the cleaning of all circulating drilling mud.

The economical effectiveness of the method for separating solid phase from drilling mud according to the invention is determined by lowering the cost owing to elimination of a multistage cleaning system lower consumption of chemicals used for maintaining the parameters of drilling mud, prolonged service life of drilling mud and improved drilling rate owing to a better quality of drilling mud cleaning.

INDUSTRIAL APPLICABILITY

The method may be most advantageously used in drilling oil and gas production wells and geological prospecting bore holes.

The method according to the invention may also be used in the chemical industry, in the manufacture of constructional materials and in other industries where solid phase is to be separated from suspensions.

We claim:

1. A method for separating solid phase from drilling mud, characterized in that forming from drilling mud (2) an adhesive layer (4) on a revolving closed curvilinear surface (3) by partially submerging it in the drilling mud (2) and forming an adhesive layer (7) of a treatment liquid (5) on another closed curvilinear surface (6) by partially submerging it in the treatment liquid and causing it to rotate in the direction opposite to the rotation direction of the first revolving curvilinear surface; both closed curvilinear surfaces (3,6) being arranged in such a manner that their respective adhesive layers (4,7) penetrate one another at a depth which is sufficient for the adhesive layer (4) of the treatment liquid (2) to take-off coarse particles of solid phase from the adhesive layers (7) of the drilling mud (5); the linear velocities of the adhesive layer (4,7) being chosen in such a manner that the resultant centrifugal forces be equal to or lower than the centripetal forces.

2. A method as claimed in claim 1, wherein the depth at which one adhesive layer (4) penetrates the other (7) is chosen in accordance with the solid phase particles size.

3. A method as claimed in claim 1, wherein the linear velocity of the adhesive layer (7) of the treatment liquid (5) is maintained equal to or greater than the linear velocity of the adhesive layer (4) of the drilling mud (2) being cleaned.

* * * * *